(12) United States Patent
Iizuka (10) Patent No.: US 7,544,887 B2
(45) Date of Patent: Jun. 9, 2009

(54) ELECTRICAL JUNCTION BOX

(75) Inventor: Tetsuya Iizuka, Yokkaichi (JP)

(73) Assignee: Sumitomo Wiring Systems, Ltd., Mie (JP)

( * ) Notice: Subject to any disclaimer, the term of this patent is extended or adjusted under 35 U.S.C. 154(b) by 0 days.

(21) Appl. No.: 11/905,472

(22) Filed: Oct. 1, 2007

(65) Prior Publication Data
US 2008/0083549 A1    Apr. 10, 2008

(30) Foreign Application Priority Data
Oct. 5, 2006    (JP) ............................. 2006-274130

(51) Int. Cl.
*H05K 5/00* (2006.01)
(52) U.S. Cl. ............................. 174/50; 174/58; 174/63; 174/135; 174/60; 220/4.02; 248/906
(58) Field of Classification Search ................... 174/50, 174/58, 63, 135, 17 R, 60; 220/3.2–3.9, 220/4.02; 439/535; 248/906
See application file for complete search history.

(56) References Cited

U.S. PATENT DOCUMENTS

| | | | | |
|---|---|---|---|---|
| 6,102,360 A | * | 8/2000 | Clegg et al. | 248/27.1 |
| 6,545,217 B2 | | 4/2003 | Sato | |
| 6,614,203 B2 | | 9/2003 | Yuasa et al. | |
| 7,294,017 B2 | * | 11/2007 | Scott | 439/535 |
| 7,323,637 B2 | * | 1/2008 | Tideback | 174/50 |
| 7,414,190 B2 | * | 8/2008 | Vo | 174/50 |
| 7,429,700 B2 | * | 9/2008 | Kanamaru et al. | 174/50 |

FOREIGN PATENT DOCUMENTS

JP    2005-204356 A    7/2005

* cited by examiner

*Primary Examiner*—Dhiru R Patel
(74) *Attorney, Agent, or Firm*—Oliff & Berridge, PLC (57) ABSTRACT

An electrical junction box includes a casing body and a lower cover to be attached to the casing body. Slant portions are provided on lower and upper end edges of opposite side walls of the casing body and lower cover. The slant portions extending downward from a first side to a second side. A double wall structure including an outer peripheral wall and an inner peripheral wall is formed on the casing body along the lower end edges including the slant portions of the casing body. A distal end of the inner peripheral wall projects over that of the outer peripheral wall. The inner peripheral wall is provided on the projecting-over section with guide ribs protruding toward the outer peripheral wall. An engaging rib that contacts a lower end of the outer peripheral wall is provided on upper end edges on opposite side walls of the lower cover. The upper end edges of the lower cover are opposed to the lower end edges on opposite sides of the casing body. A protrusion piece projects from the engaging rib to be inserted into a clearance between the inner and outer peripheral walls of the casing body. The protrusion piece is guided and inserted into the clearance between the inner and outer peripheral walls by the guide ribs. With such a structure, workability of assembling a casing body and a lower cover can be enhanced, while maintaining a high waterproof function of the box by improving a fitting structure of the casing body and lower cover.

5 Claims, 9 Drawing Sheets

ELECTRICAL JUNCTION BOX

This application claims priority from Japanese Patent Application No. 2006-274130 filed in the Japanese Patent Office on Oct. 5, 2006, the disclosure of which is incorporated herein by reference in its entirety.

BACKGROUND

This invention relates to an electrical junction box, and more particularly relates to an electrical junction box to be mounted on a vehicle body, such as a motor vehicle body, in which a casing body is locked on a lower cover to enhance workability of assembling the casing body and lower cover.

An electrical junction box mounted in a motor vehicle engine compartment typically includes (1) a casing body provided with a wire harness insertion opening and (2) a lower cover to be locked on the casing body. In a typical electrical junction box, the casing body is provided on an inner part of a side wall with a double wall structure having an inner wall to ensure a waterproof function. In many cases, a peripheral wall of the lower cover is inserted into a clearance in the double wall structure to couple the casing body to the lower cover.

Generally, in a waterproof electrical junction box, the peripheral wall of the lower cover and the double wall structure of the casing body are partially inclined. This requires that a worker pay particular attention to the opposite ends of the slant portions of the lower cover and the double wall structure. Furthermore, if there are additional fitting portions on the lower cover and casing body, the assembling work will become difficult and burdensome to the worker because the worker must take care of the additional fitting portions as well as the regular fitting portions. Accordingly, it is desirable to enhance workability of assembling the casing body and lower cover while maintaining the waterproof function by improving the fitting structure of the casing body and lower cover.

Figure 9:
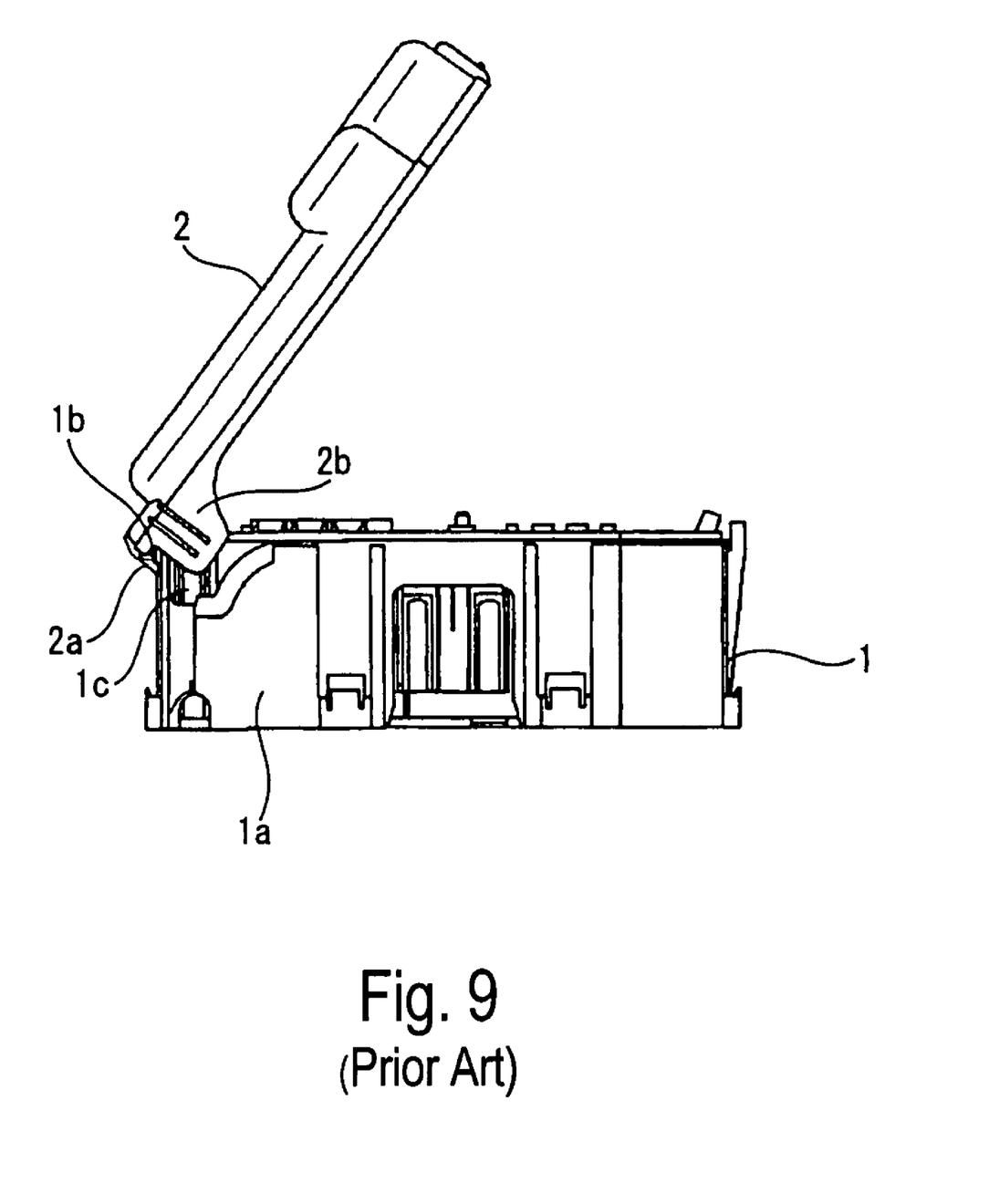
FIG. 9 is a side elevation view of a conventional electrical junction box.

A fitting structure for a casing body and a lower cover, which restricts water from entering an interior of an electrical junction box, has been proposed. For example, FIG. 9 shows an electrical junction box disclosed in JP 2005-204356A. The electrical junction box includes a main cover 1 provided on a side wall 1a with an engaging protrusion 1b and an upper cover 2 provided with an engaging frame portion 2a opposed to the engaging protrusion 1b. The engaging protrusion 1b is coupled to the engaging frame portion 2a so that the upper cover 2 can be rotatably attached to the main cover 1. The main cover 1 is provided on a side wall with an opening 1c for a terminal. A cover wall 2b is formed on the upper cover 2 to close the opening 1c.

When the engaging protrusion 1b of the main cover 1 is coupled to the engaging frame portion 2a of the upper cover 2 and when the upper cover 2 is mounted on the main cover 1, (1) the cover wall 2b of the upper cover 2 closes the opening 1c in the main cover 1 and (2) a distal end of the cover wall 2b is inserted into a guide engagement portion 1d of the main cover 1. Since the guide engagement portion 1d pushes the cover wall 2b inward, it is possible to restrict water from entering a clearance between the side wall 1a of the main cover 1 and the cover wall 2b of the upper cover 2.

However, during high pressure water washing, the side wall 1a of the main cover 1 or the cover wall 2b of the upper cover 2 may be subject to a deflection. This creates a possibility of water entering from the opposite sides of the cover wall 2b into the opening 1c, since the side wall 1a of the main cover 1 merely contacts the cover wall 2b of the upper cover 2. Consequently, the electrical junction box has an inadequate waterproof function.

Additionally, when the upper cover 2 is mounted on the main cover 1, the engaging protrusion 1b of the main cover 1 may become disengaged from the engaging frame portion 2a of the upper cover 2. Furthermore, since a worker must insert a distal end of the cover wall 2b into the guide engagement portion 1d while the worker also takes care of engagement between the engaging protrusion 1b and the engaging frame portion 2a, the work will become difficult and workability will deteriorate.

SUMMARY

In view of the above problems, an object of exemplary embodiments of the present invention is to provide an electrical junction box that can enhance workability of assembling a casing body and a lower cover while maintaining a high waterproof function of the box by improving a fitting structure of the casing body and lower cover.

In order to accomplish the above object, embodiments of the present invention include an electrical junction box having a casing body and a lower cover to be locked on the casing body, which are inclined downward from a first side to a second side in order to avoid interference between the electrical junction box and other vehicle-mounted parts disposed under the box. The casing body is provided on lower end edges of opposite side walls with slant portions extending downward from the first side to the second side. A double wall structure including an outer peripheral wall and an inner peripheral wall is formed on the casing body along the lower end edges including the slant portions. A distal end of the inner peripheral wall projects over that of the outer peripheral wall. The inner peripheral wall is provided on the projecting-over section with guide ribs protruding toward the outer peripheral wall. The lower cover is provided on upper end edges of opposite side walls with slant portions extending downward from the first side to the second side along the slant portions of the casing body. An engaging rib that contacts a lower end of the outer peripheral wall is provided on the upper end edges on opposite side walls of the lower cover. The upper end edges are opposed to the lower end edges on the opposite side walls of the casing body. A protrusion piece projects from the engaging rib to be inserted into a clearance between the inner peripheral wall and the outer peripheral wall of the casing body. The protrusion piece is guided and inserted into the clearance between the inner and outer peripheral walls by the guide ribs.

The guide ribs are provided on the slant portions on the opposite sides of the casing body in the present invention. When the protrusion piece on the slant portions of the lower cover contacts the guide ribs protruding from the inner peripheral wall of the casing body, the protrusion piece of the lower cover is guided into the clearance between the inner and outer peripheral walls of the casing body by the guide ribs to be smoothly inserted into the clearance between the inner and outer peripheral walls.

On assembling the casing body and lower cover, it is possible to readily insert the protrusion piece of the lower cover into the clearance between the inner and outer peripheral walls without carefully watching the slant portions on the casing body and lower cover. Accordingly, a worker can easily assemble the casing body and lower cover, thereby enhancing workability in assembling.

Also, the guide ribs are formed on the inner peripheral wall to protrude toward the outer peripheral wall. Since the guide ribs can push the protrusion piece of the lower cover onto the outer peripheral wall of the casing body, the protrusion piece of the lower cover does not rattle in the clearance between the inner and outer peripheral walls, thereby restricting generation of noises.

In addition, since the double wall structure including the inner and outer peripheral walls is provided on the peripheral wall of the casing body, even if water enters a clearance between the outer peripheral wall of the casing body and the protrusion piece of the lower cover by accident, the inner peripheral wall of the casing body can restrict entry of water, thereby obtaining a waterproof function while enhancing workability.

Preferably, an inclination angle of the inner peripheral wall along the slant portions of the casing body is different from that of the outer peripheral wall and an amount of projection over the outer peripheral wall increases downward.

Since a lower end of the outer peripheral wall of the casing body has the same inclination angle as that of the engaging rib of the lower cover, the lower end can contact with the engaging rib. However, since the inclination angle of the inner peripheral wall is different from those of the outer peripheral wall and engaging rib, the engaging rib interferes with the inner peripheral wall so that the inner peripheral wall cannot fit the engaging rib.

Accordingly, even if it is mistakenly attempted to fit the casing body on the lower cover in a state in which the inner peripheral wall of the casing body extends over the protrusion piece of the lower cover, the inner peripheral wall cannot be fitted on the lower cover and thus the casing body and lower cover are not brought into a fitting condition. Therefore, it is possible to prevent an error in fitting between the casing body and the lower cover by different slant angles of the inner and outer peripheral walls of the casing body.

The electrical junction box according to the present invention is suitable for arrangement along an upper surface of a wheel well in an engine compartment. In particular, a relay block having a small height is contained in an interior at the first side of the casing body, and an electrical block including a radiation part having a great height is contained in an interior projecting downward at the second side of the casing body. Consequently, the electrical junction box of the present invention is formed into a special configuration in which a second side of the casing body inclines downward more than the first side of the casing body.

Since in the above electrical junction box the relay block having a small height is contained in the first side of the casing body at the wheel well side, the electrical junction box can be efficiently arranged in a narrow space above the wheel well and can effectively utilize a space in the engine compartment.

As described above, according to the present invention, since the guide ribs are provided on the slant portions of the casing body, it is possible for a worker to precisely fit and connect the casing body and lower cover without paying close attention to insertion of the right and left slant portions on the lower cover into the clearance between the outer and inner peripheral walls upon assembling the casing body and lower cover. Accordingly, the worker can readily assemble the casing body and lower cover, thereby enhancing workability of assembling.

Also, since the guide ribs are provided on the protrusion section of the inner peripheral wall to project toward the outer peripheral wall, the guide ribs can push the protrusion piece of the lower cover onto the outer peripheral wall of the casing body. This can restrict the protrusion piece from rattling in the clearance between the inner and outer peripheral walls, thereby restricting generation of noises.

In addition, since the double wall structure including the inner and outer peripheral walls is provided on the peripheral wall of the casing body, even if water enters a clearance between the outer peripheral wall of the casing body and the protrusion piece of the lower cover by accident, the inner peripheral wall of the casing body can restrict entry of water, thereby obtaining a waterproof function while enhancing workability.

Furthermore, since the inclination angles of the inner and outer peripheral walls are different from each other, the inner peripheral wall and engaging rib interfere with each other so that they cannot be fitted on each other, thereby preventing an error in fitting between the casing body and the lower cover.

DETAILED DESCRIPTION OF EXEMPLARY EMBODIMENTS

Referring now to the drawings, an exemplary embodiment of an electrical junction box will be described below.

FIGS. 1 through 8C show an exemplary embodiment of an electrical junction box.

Figure 1:
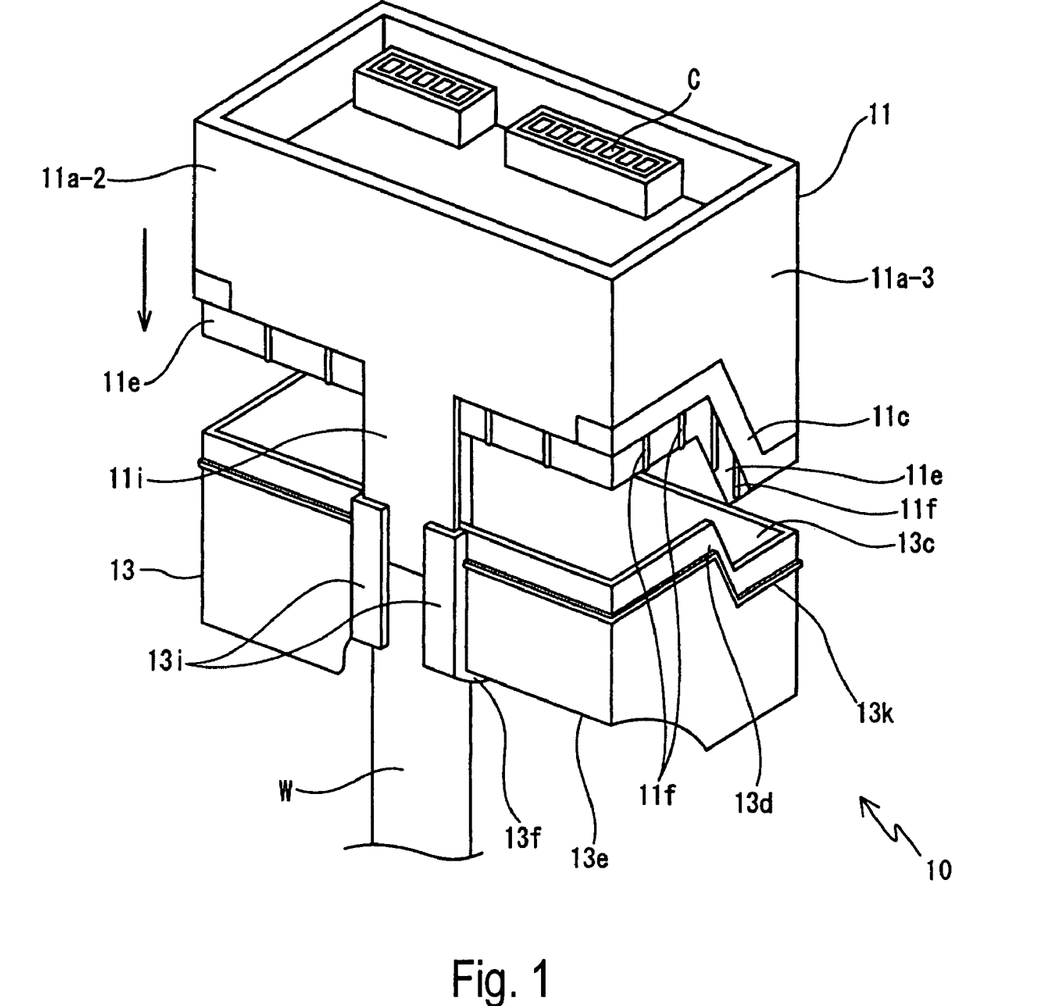
FIG. 1 is a perspective view of an embodiment of an electrical junction box, illustrating a step for attaching a casing body to a lower cover.

As shown in FIG. 1, an embodiment of an electrical junction box 10 includes a casing body 11 that accommodates an internal circuit member C, and a lower cover 13 that supports a wire harness W to be electrically connected to the internal circuit member C. The casing body 11 is mounted on the lower cover 13 and can be made of any suitable material, for example a resin material.

Figure 2:
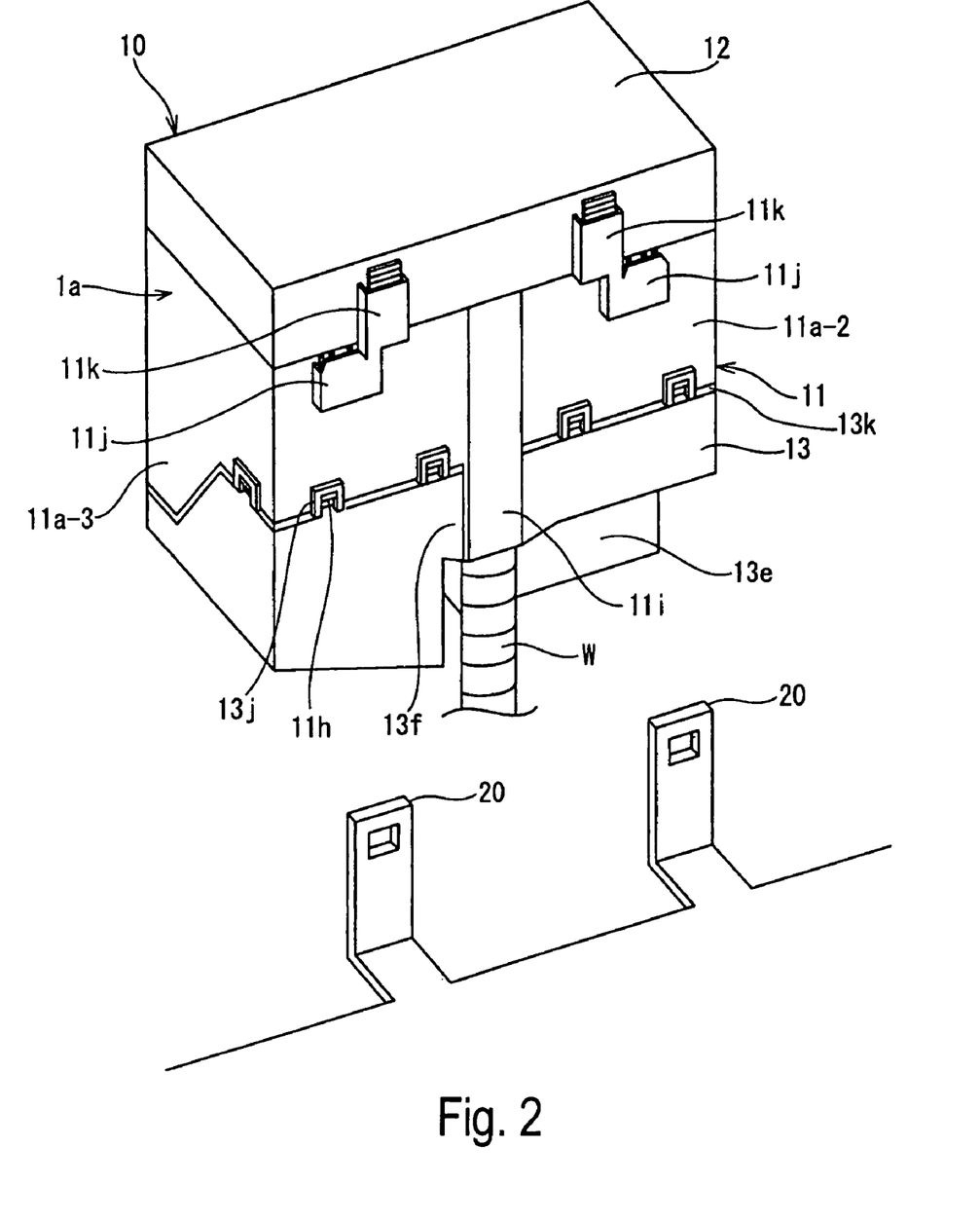
FIG. 2 is a perspective view of an embodiment of an electrical junction box, illustrating a step for attaching an embodiment of the electrical junction box to a vehicle body.
Figure 3:
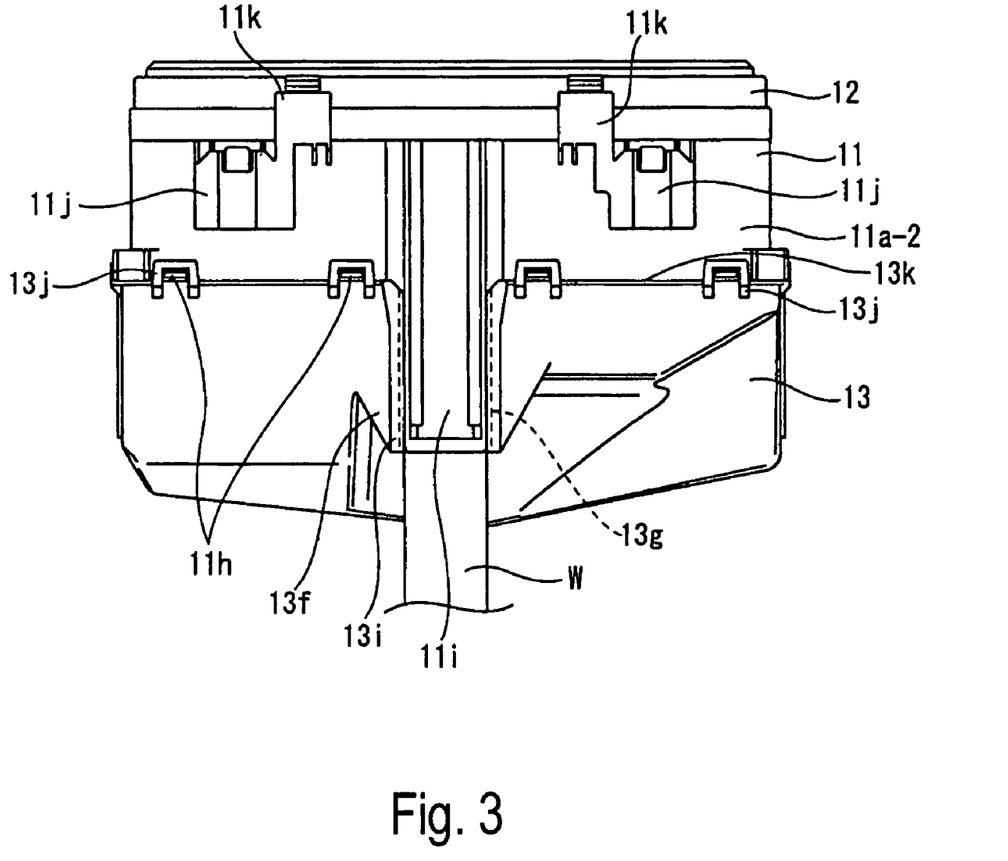
FIG. 3 is a front elevation view of an embodiment of an electrical junction box.

The electrical junction box 10 is disposed along an upper surface of a wheel well (not shown) in a motor vehicle. As shown in FIG. 2, in order to avoid interference between the upper portion of the electrical junction box 10 and the wheel well (not shown) below, the casing body 11 and the lower cover 13 are provided with slant portions 11c and 13c that slant downward from a first side to a second side.

Figure 4A:
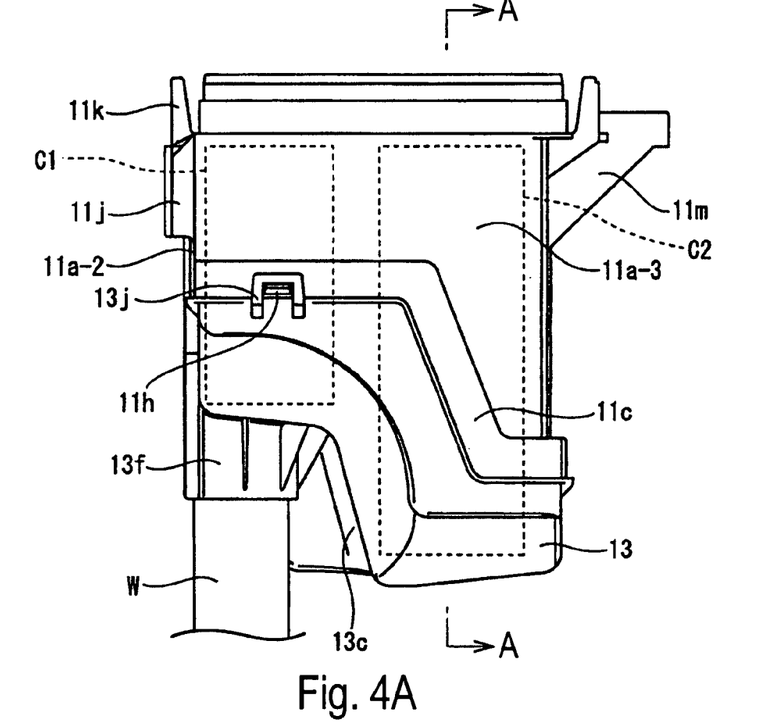
FIG. 4A is a right side elevation view of an embodiment of an electrical junction box.

As shown in FIG. 4A, a relay block C1 is contained in a first side of an interior of the casing body 11 while an electrical block C2 having a radiation part is contained at a second side of the interior of the casing body 11. In some embodiments, the relay block C1 may have a height smaller than the height of the electrical block C2.

As shown in FIG. 2, the electrical junction box 10 is assembled by mounting an upper cover 12 on the casing body 11. The casing body is coupled to and possibly locked on the lower cover 13. The electrical junction box 10 can be secured to a vehicle body (not shown) through a metal bracket 20 projecting from the vehicle body.

As shown in FIG. 5A through FIG. 6C, the casing body 11 can include a peripheral wall 11a. The internal circuit member C is contained in an area enclosed by the peripheral wall 11a of the casing body 11.

Figure 5A:
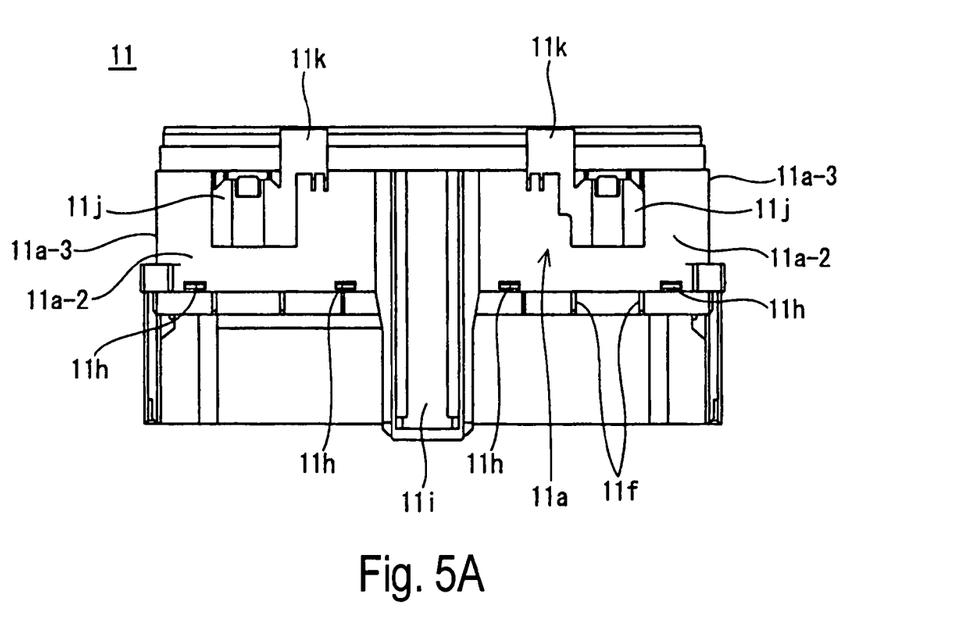
FIG. 5A is a front elevation view of a casing body.
Figure 5B:
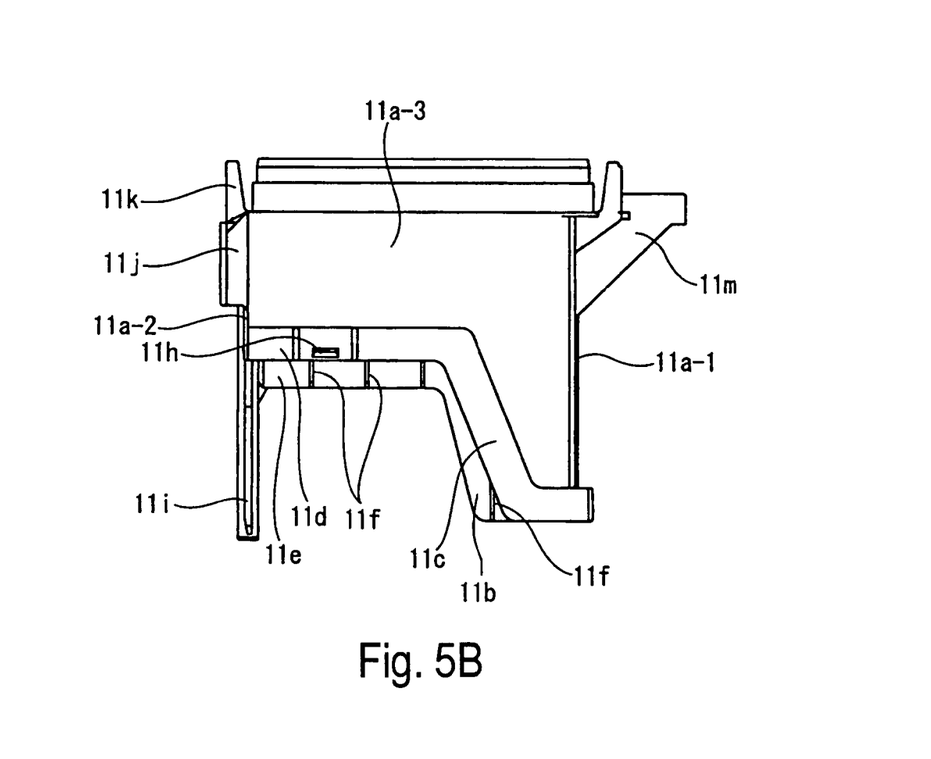
FIG. 5B is a right side elevation view of the casing body shown in FIG. 5A.

As shown in FIGS. 5A and 5B, the casing body 11 is provided on each of opposite side walls 11a-3 with a slant portion 11c that inclines downward from a first side to a second side.

The peripheral wall 11a is provided with an outer peripheral wall 11d that extends along a lower edge of the peripheral wall 11a from the opposite side walls 11a-3 to a second side wall 11a-1. The peripheral wall 11a is also provided inside the outer peripheral wall 11d with an inner peripheral wall 11e. The lower edges of the peripheral wall 11a of the casing body 11 are formed into a double wall structure having the inner peripheral wall 11e and outer peripheral wall 11d.

The inner peripheral wall 11e extends from a lower end side (a right side in FIG. 5B) of the slant portion 11c of the casing body 11 to a first side of the portion 11c. A distal end of the inner peripheral wall 11e extends over a distal end of the outer peripheral wall 11d to define a protrusion section 11b. An inclination angle of the inner peripheral wall 11e along the slant portion 11c is different from that of the outer peripheral wall 11d along the slant portion 11c. An amount of projection of the protrusion section 11b on the slant portion 11c increases gradually downward. Another part of the inner peripheral wall 11e except the part extending from the slant portion 11c of the casing body 11 to the first side extends in parallel with the outer peripheral wall 11d, has a similar or equal length as that of the outer peripheral wall 11d, and has no protrusion section 11b.

Figure 6A:
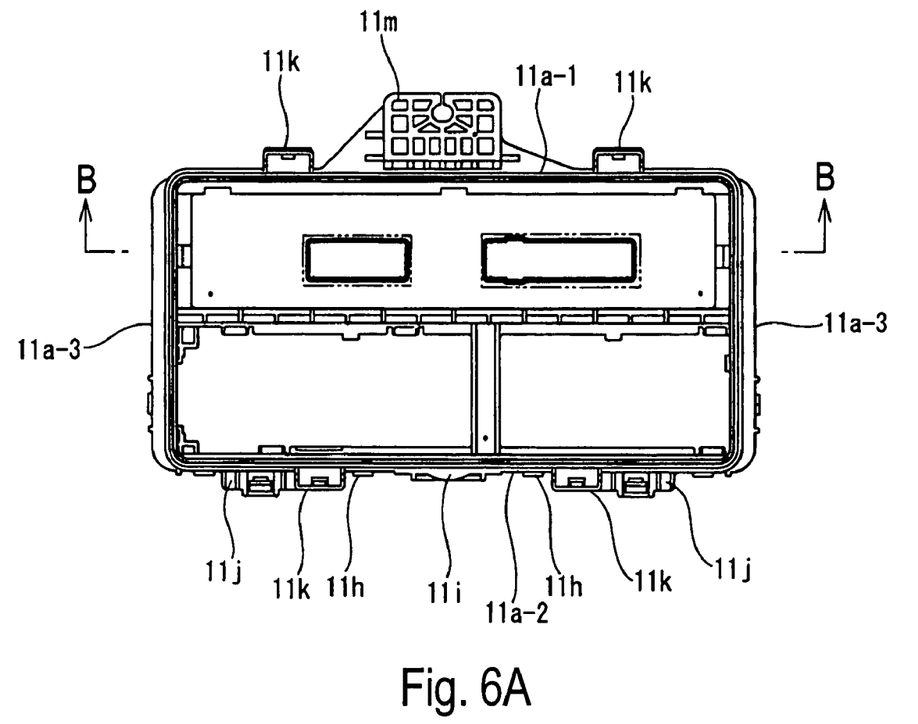
FIG. 6A is a plan view of a casing body.
Figure 6B:
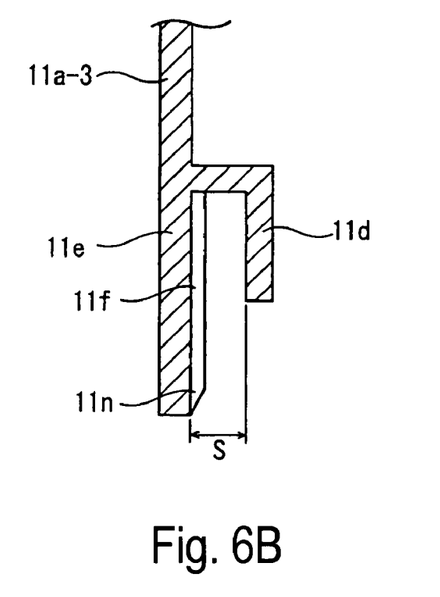
FIG. 6B is an enlarged cross section view of a main part of the casing body taken along lines B-B in FIG. 6A.
Figure 6C:
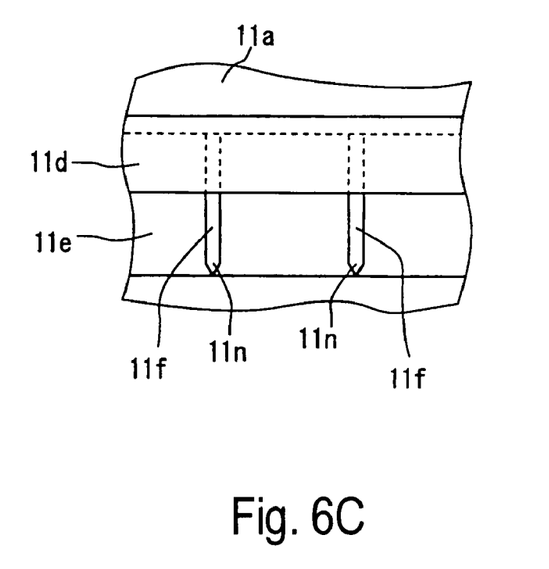
FIG. 6C is an enlarged right side elevation view of the casing body shown in FIG. 6A.

Guide ribs 11f are provided on the protrusion section 11b of the inner peripheral wall 11e and spaced away from each other at a given distance. Each guide rib 11f projects toward the outer peripheral wall 11d and extends vertically or substantially vertically. As shown in FIGS. 6B and 6C, each guide rib 11f is provided with a tapered portion 11n having a triangular shape in a side view. While this embodiment uses a tapered portion with a triangular shape in a side view, various other shapes in a side view, such as a rectangle, a diamond, a circle, or an oval can also be used. When a protrusion piece 13d of the lower cover 13 mentioned below contacts the guide rib 11f, the protrusion piece 13d is guided by the guide rib 11f and inserted into a clearance S between the outer peripheral wall 11d and the inner peripheral wall 11e on which the guide rib 11f projects. The guide rib 11f engages with the protrusion piece 13d of the lower cover 13 in the clearance S. While the guide rib 11f is shown as being attached to the inner peripheral wall 11e, the guide rib may be located at various positions within the clearance between the outer peripheral wall 11d and the inner peripheral wall 11e. Further, the guide rib 11f may be positioned below the inner peripheral wall 11e or the outer peripheral wall 11d.

The casing body 11 is provided at a given distance on a lower end of the peripheral wall 11a with pawl portions 11h that can be engaged with the lower cover 13.

As shown in FIGS. 5A and 5B, a first side peripheral wall 11a-2 of the casing body 11 can include a "spatula-like" cover section 11i extending downward from a lower end of the wall 11a-2. This spatula-like cover section 11i can be provided at a variety of positions on the first side peripheral wall 11a-2, such as a centrally located position. The cover section 11i can be fitted in guide recesses 13i of the lower cover 13 so as to cover the wire harness W.

A pair of vehicle body bracket receiving portions 11j, 11j project from an upper part of the first side wall 11a-2 of the casing body 11 to engage with a vehicle body bracket 20. A pair of locking portions 11k, 11k are provided on the first side wall 11a-2 to engage with the upper cover 12. The locking portions 11k are connected to the vehicle body bracket receiving portions 11j. A vehicle body attaching portion 11m projects horizontally from a second side wall 11a-1 of the casing body 11 to be secured to a vehicle body side attaching portion by a bolt, a screw, or the like.

Figure 7A:
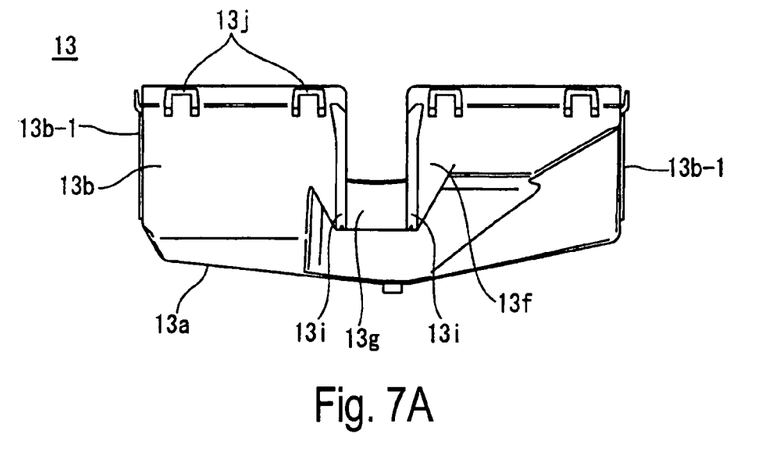
FIG. 7A is a front elevation view of a lower cover.
Figure 7B:
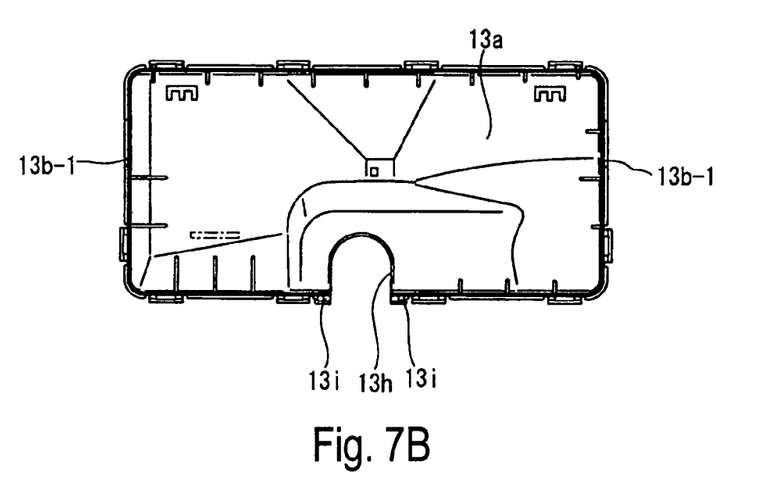
FIG. 7B is plan view of the lower cover shown in FIG. 7A.
Figure 7C:
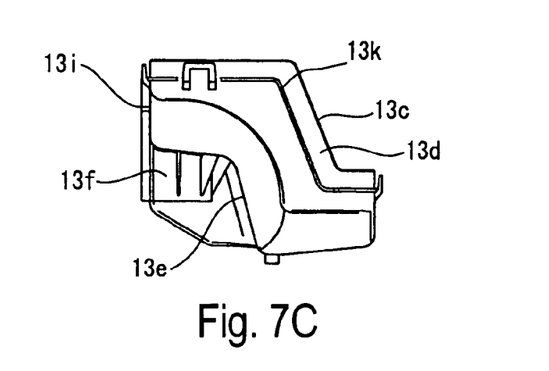
FIG. 7C is a right side elevation view of the lower cover shown in FIG. 7A.

As shown in FIGS. 7A to 7C, the lower cover 13 includes a peripheral wall 13b protruding up from a bottom wall 13a. Opposite side walls 13b-1 are extend from the first side to the second side. The opposite side walls 13b-1 include slant portions 13c to extend along lower end edges of the casing body 11.

The peripheral wall 13b is provided with an engaging rib 13k that projects from an outer surface of the peripheral wall 13b and that is adapted to contact a lower end of the outer peripheral wall 11d of the casing body 11. A protrusion piece 13d projects toward the casing body 11 from the engaging rib 13k.

Figure 4B:
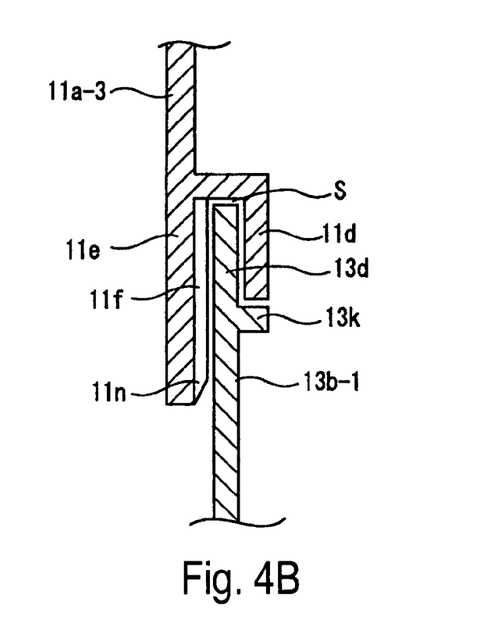
FIG. 4B is an enlarged cross section view of a main part of an embodiment of an electrical junction box taken along lines A-A in FIG. 4A.

As shown in FIG. 4B, the protrusion piece 13d is inserted into the clearance S between the inner and outer peripheral walls 11e and 11d of the casing body 11. A distal end of the outer peripheral wall 11d of the casing body 11 contacts the engaging rib 13k. Under this condition, an outer surface of the peripheral wall 13b of the lower cover 13 is made continuous with an outer surface of the peripheral wall 11a of the casing body 11.

The lower cover 13 is provided in a lower part with a recess 13e depressed inward from the peripheral wall 13b to the bottom wall 13a. A wire harness insertion way 13f is provided in the recess 13e at a position through which a wire harness W passes.

The wire harness insertion way 13f is provided on a first side with an opening 13g and a wire harness drawing-out opening 13h extending vertically. The cover section 11i is mounted on the first side opening 13g to close it.

Guide recesses 13i are provided on the peripheral wall 13b along opposite vertical side edges of the first side opening 13g to engage opposite side edges of the cover section 11i of the casing body 11. Frame portions 13j project from an upper end of the peripheral wall 13b of the lower cover 13 to be locked on the pawl portions 11h of the casing body 11.

Next, an embodiment of a process for attaching the casing body 11 to the lower cover 13 is described.

As shown in FIG. 1, the internal circuit member C and wire harness W connected to the member C can be previously incorporated into the casing body 11. The casing body 11 is mounted on the lower cover 13 while the wire harness W hangs down from the casing body 11.

Figure 8A:
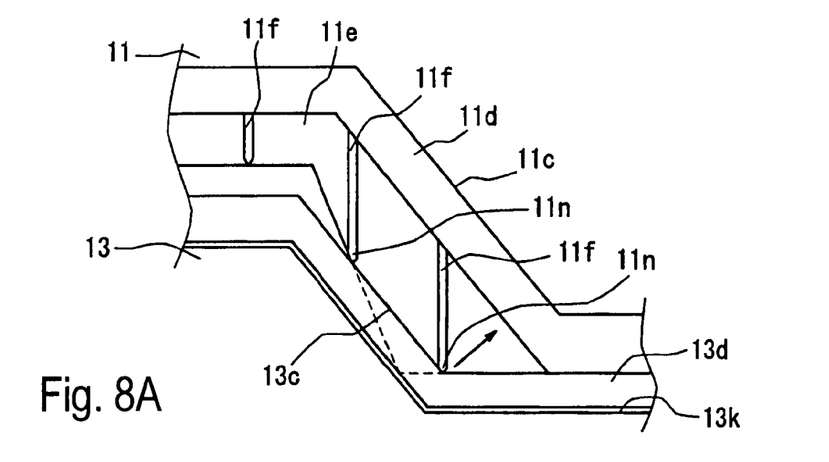
FIG. 8A is a side elevation view of slant portions of a casing body and a lower cover, illustrating a position in which slant portions are about to be fitted on each other.

First, the cover section 11i of the casing body 11 slidably engages with and is inserted into the guide recesses 13i of the lower cover 13. When the cover section 11i enters the guide recesses by a distance of about 1 cm (one centimeter), as shown in FIG. 8A, the tapered portions 11n of the guide ribs 11f projecting from the inner peripheral wall 11e of the slant portion 11c of the casing body 11 contact the protrusion piece 13d of the lower cover 13. Of course, the location where the tapered portions 11n contact the protrusion piece 13d of the lower cover 13 can be more or less than 1 cm from where the cover section 11i enters the guide recess.

Figure 8B:
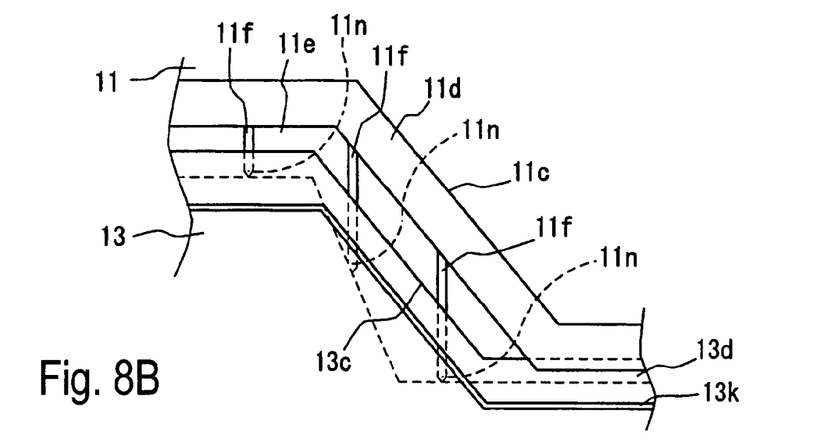
FIG. 8B is a side elevation view of slant portions of a casing body and a lower cover, illustrating a position in which the slant portions are fitted partway on each other.
Figure 8C:
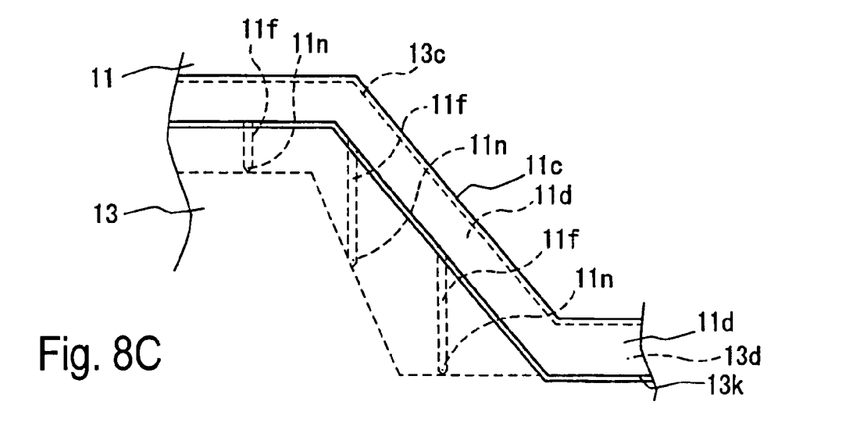
FIG. 8C is a side elevation view of slant portions of a casing body and a lower cover, illustrating a position in which the slant portions have been fitted on each other.

As shown in FIG. 8A, when the protrusion piece 13d contacts the tapered portions 11n of the guide ribs 11f and the lower cover 13 is fitted into the casing body 11, the protrusion piece 13d is moved to slide on the tapered portion 11n in a direction shown by an arrow. Then, as shown in FIGS. 8B and 8C, the guide ribs 11f guide the protrusion piece 13d so that the protrusion piece 13d is inserted into the clearance S between inner and outer peripheral walls 11e and 11d.

Positioning of the casing body 11 and lower cover 13 is accomplished by fitting the cover section 11i of the casing body 11 with the guide recesses 13i of the lower cover 13 and fitting of the opposite slant portions 11c of the casing body 11 with the protrusion piece 13d of the lower cover 13.

Thus, the protrusion piece 13d is inserted into the clearance S (shown in FIG. 4B) between the inner and outer peripheral walls 11e and 11d of the slant portions 11c, while the cover section 11i of the casing body 11 is inserted into the guide recesses 13i of the lower cover 13. Then, as shown in FIG. 8C and FIG. 4B, the distal end of the outer peripheral wall 11d of the casing body 11 contacts the engaging rib 13k of the lower cover 13.

Thereafter, the pawl portions 11h (shown in FIG. 4A) of the casing body 11 and the frame portions 13j of the lower cover 13 are interlocked to incorporate the casing body 11 with the lower cover 13.

Thus, when the cover section 11i of the casing body 11 is inserted into the guide recesses 13i of the lower cover 13, the protrusion piece 13d on each slant portion 13c of the lower cover 13 contacts the guide ribs 11f on each slant portion 11c of the casing body 11 and the protrusion piece 13d of the lower cover 13 can be guided into the clearance S between the inner and outer peripheral walls 11e and 11d by the guide rib 11f.

Accordingly, it is possible to guide the protrusion piece 13d of the lower cover 13 into the clearance S between the inner and outer peripheral walls 11e and 11d of the casing body 11 by inserting the cover section 11i of the casing body 11 into the guide recesses 13i of the lower cover 13. Thus, when the casing body 11 is incorporated with the lower cover 13, it is unnecessary to carefully insert the three fitting parts, that is, the fitting part between the cover 11i of the casing body 11 and the guide recesses 13i of the lower cover 13 and the fitting parts on the slant portions 13c of the lower cover 13, into the clearance S between the inner and outer peripheral walls 11e and 11d of the casing body 11. Accordingly, it is possible to eliminate a step in which a worker fits the casing body 11 into the lower cover 13 while watching the slant portions 11c of the opposite side walls 11a-3 of the casing body 11, thereby enhancing workability.

Also, since the lower end of the outer peripheral wall 11d of the casing body 11 has the same inclination angle as that of the engaging rib 13k of the lower cover 13, it is possible to engage them with each other. However, since the inclination angle of the inner peripheral wall 11e is different from that of the outer peripheral wall 11d and also different from that of the engaging rib 13k, it is possible to prevent an error in fitting between the casing body and the lower cover 13 by the different inclination angles of the inner and outer peripheral walls 11e and 11d of the casing body 11. Specifically, when the protrusion piece 13d is inserted inward from the inner peripheral wall 11e, the inner peripheral wall 11e will interfere in the engaging rib 13k and the protrusion piece 13d cannot enter the clearance S between the inner and outer peripheral walls 11e and 11d of the casing body 11. Consequently, the slant portions 11c of the casing body 11 will be shifted from the slant portions 13c of the lower cover 13. Even if the inner peripheral wall 11e moves over the protrusion piece 13d to couple the casing body 11 to the lower cover 13, the casing body 11 and lower cover 13 are not brought into a fitting position.

Also, since the peripheral wall 11a of the casing body 11 includes the inner peripheral wall 11e, it is possible for the inner peripheral wall 11e to restrict water from entering the casing body 11, even if water enters a clearance between the outer peripheral wall 11d of the casing body 11 and the peripheral wall 13b of the lower cover 13. Accordingly, it is possible to enhance workability and to surely obtain a waterproof function.

What is claimed is:

1. An electrical junction box comprising:
a casing body; and
a lower cover to be attached to the casing body, the lower cover having a mating face that is inclined downward from a first side to a second side of said casing body, wherein said casing body includes:
casing body slant portions provided on lower end edges of opposite side walls, the casing body slant portions extending downward from the first side to the second side; and
a double wall structure including an outer peripheral wall and an inner peripheral wall, the double wall structure being formed on the casing body along the lower end edges including the casing body slant portions,
a distal end of the inner peripheral wall projecting over that of the outer peripheral wall, and
the inner peripheral wall being provided with guide ribs on the distal end of the inner peripheral wall that projects over the outer peripheral wall, the guide ribs protruding toward the outer peripheral wall;
wherein said lower cover includes:
lower cover slant portions provided on upper end edges of opposite side walls, the lower cover slant portions extending downward from the first side to the second side along the casing body slant portions; and
an engaging rib that contacts a lower end of said outer peripheral wall, the engaging rib being provided on the upper end edges on opposite side walls of said lower cover,
the upper end edges opposing the lower end edges on the opposite side walls of the casing body,
wherein a protrusion piece projects from the engaging rib and is inserted into a clearance between the inner peripheral wall and the outer peripheral wall of the casing body.

2. An electrical junction box according to claim 1, wherein an inclination angle of said inner peripheral wall along said casing body slant portions is different from that of said outer peripheral wall, and an amount of projection over said outer peripheral wall increases downward.

3. An electrical junction box according to claim 2,
wherein a relay block having a first height is contained disposed within the electrical junction box at the first side of said casing body; and wherein an electrical block including a radiation part having a second height, greater than the first height, is disposed within the electrical junction box so as to project downward at the second side of said casing body.

4. An electrical junction box according to claim 1,
wherein a relay block having a first height is disposed within the electrical junction box at the first side of the casing body; and
wherein an electrical block including a radiation part having a second height, greater than the first height, is disposed within the electrical junction box so as to project downward at the second side of said casing body.

5. An electrical junction box comprising:
a casing body including a first side and a second side opposing the first side, the casing body comprising:
  slant portions that extend downward from the first side to the second side;
  a double wall structure including an outer peripheral wall and an inner peripheral wall, the inner peripheral wall including (1) a protrusion section that extends past a distal end of the outer peripheral wall and (2) guide ribs projecting toward the outer peripheral wall; and
    a cover section formed on a third side of the casing body; and
a lower cover having a peripheral wall including slant portions corresponding to the slant portions of the casing body, the peripheral wall including:
  a lower cover engaging rib projecting from an outer surface of the peripheral wall, the lower cover engaging rib being adapted to contact the outer peripheral wall of the casing body;
  a lower cover protrusion piece that extends from the lower cover engaging rib to the distal end of the peripheral wall; and
  a guiding member engageable with the cover section of the casing body,
wherein the cover section is inserted into the guiding member;
wherein the distal end of the outer peripheral wall of the casing body contacts the lower cover engaging rib; and
wherein the lower cover protrusion piece is inserted into a clearance between the inner and outer peripheral walls of the casing body so that the guide ribs of the inner peripheral wall contact the protrusion piece of the lower cover.

* * * * *